United States Patent Office 3,165,459
Patented Jan. 12, 1965

3,165,459
PROCESS OF MANUFACTURE
Wilhelm Peter Seebode and Charles Henry Vasey, Grangemouth, Scotland, assignors to Imperial Chemical Industries Limited, London, England, a corporation of Great Britain
No Drawing. Filed Dec. 2, 1960, Ser. No. 73,227
Claims priority, application Great Britain, Dec. 21, 1959, 43,324/59
3 Claims. (Cl. 204—74)

This invention relates to a process of manufacture and more particularly it relates to a process for the manufacture of pyrimidine derivatives which possess useful anticonvulsant properties.

According to the invention we provide a process for the manufacture of pyrimidine derivatives of the formula:

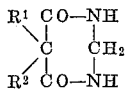

wherein $R^1$ stands for the phenyl radical, which may optionally be substituted by a halogen atom, and wherein $R^2$ stands for an alkyl radical, which comprises the reduction of an imino-derivative of the formula:

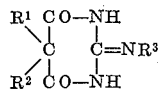

wherein $R^1$ and $R^2$ have the meanings stated above, and wherein $R^3$ stands for hydrogen or the cyano radical.

As a suitable halogen atom there may be mentioned, for example, the chlorine atom. As a suitable value for $R^2$ there may be mentioned, for example, an alkyl radical of not more than 4 carbon atoms, for example the ethyl radical. As particularly suitable compounds for use as starting materials in the process of the invention there may be mentioned, for example, the compounds 5-ethyl-2-imino-5-phenylhexahydropyrimidine-4,6-dione and 2-cyanimino-5-ethyl-5-phenylhexahydropyrimidine-4,6-dione.

The said reduction may be brought about, for example, by electrolytic reduction, for example by electrolytic reduction in the presence of sulphuric acid using a lead, mercury, zinc or tin cathode, and a lead, platinum or carbon anode, or by reaction with zinc, for example zinc dust, and a mineral acid, for example hydrochloric acid or sulphuric acid, optionally in the presence of an inert diluent or solvent, for example methanol or ethanol.

As said, the pyrimidine derivatives which are manufactured according to the process of the present invention are useful as anticonvulsants, as described in United Kingdom patent specifications No. 666,027 and No. 734,512.

The invention is illustrated but not limited by the following examples:

Example 1

10 g. of 5-ethyl-2-imino-5-phenylhexahydropyrimidine-4,6-dione are suspended in 350 cc. of 80% aqueous sulphuric acid contained in a cylindrical porous pot (7.5 cm. diameter, 16.5 cm. deep). The porous pot is placed in a cylindrical lead beaker which is then filled with 60% sulphuric acid up to the level of the mixture in the porous pot. A U-shaped lead pipe (20 mm. diameter; effective immersed surface area of 100 sq. cm.) is partly immersed, bend downwards, in the mixture in the porous pot. A source of direct current electricity is connected to the cell: the positive connection being taken to the lead beaker and the negative connection to the lead pipe. A current of 5 amps. is passed through the cell during 24 hours; a potential difference of 5 volts is observed between the electrodes.

The contents of the porous pot are filtered through a sintered-glass funnel and the filtrate is poured into 1 l. of water. The mixture is cooled to 20–25° C. and filtered. The solid residue is washed with water until acid-free, and is then crystallised from 80% aqueous ethanol. There is thus obtained 5-ethyl-5-phenylhexahydropyrimidine-4,6-dione, M.P. 280–281° C.

Example 2

10 g. of 2-cyanimino-5-ethyl-5-phenylhexahydropyrimidine-4,6-dione are dissolved in 350 cc. of 80% sulphuric acid, and the solution is electrolytically reduced in a cell similar to that described in Example 1, with the difference that a current of 2 amps. is passed through the cell during 24 hours.

The product is isolated by a similar procedure to that described in Example 1, and there is thus obtained 5 - ethyl - 5 - phenylhexahydropyrimidine - 4,6 - dione, M.P. 280–281° C.

The 2-cyanimino-5-ethyl-5-phenylhexahydropyrimidine-4,6-dione used as starting material may be obtained as follows:

92 g. of dicyandiamide and 264 g. of diethyl α-ethyl-α-phenylmalonate are added to a solution of 46 g. of sodium in 300 g. of methanol. The mixture is heated under reflux during 10 hours and the methanol is then removed by distillation. The residue is dissolved in 2000 g. of water and the solution is adjusted to pH 2.5 with dilute sulphuric acid. The mixture is filtered and the solid residue is crystallised from aqueous ethanol. There is thus obtained 2-cyanimino-5-ethyl-5-phenylhexahydropyrimidine-4,6-dione, M.P. 223° C.

Example 3

A suspension of 256 g. of 2-cyanimino-5-ethyl-5-phenylhexahydropyrimidine-4,6-dione and 275 g. of zinc dust in 1200 g. of methanol is stirred and heated under reflux at 60–65° C. 975 g. of concentrated hydrochloric acid are added during a period of 6 hours, during which time the temperature of the reaction mixture is raised to 70° C. 800 g. of aqueous methanol are removed from the mixture by distillation. 1250 g. of water are added to the residue and the mixture is heated at 70° C. during 1 hours, and then cooled. The mixture is filtered and the solid residue is crystallized from aqueous ethanol. There is thus obtained 5-ethyl-5-phenylhexahydropyrimidine-4,6-dione, M.P. 280–281° C.

Example 4

A suspension of 256 g. of 2-cyanimino-5-ethyl-5-phenylhexahydropyrimidine-4,6-dione and 325 g. of zinc dust in 600 g. of methanol is stirred and heated under reflux. A solution of 500 g. of hydrogen chloride in 1800 g. of methanol is added over a period of two hours. The mixture is heated under reflux for a further sixteen hours after which methanol is distilled off until the internal temperature rises to 95° C. The mixture is then filtered to remove unchanged zinc, and the filtrate is added to 5000 g. of water. The resulting mixture is filtered and the solid residue is washed with water and then with methanol. The solid is crystallised from aqueous ethanol. There is thus obtained 5-ethyl-5-phenylhexahydropyrimidine-4,6-dione, M.P. 280–281° C.

A similar preparation using sulphuric acid in place of methanolic hydrogen chloride also gives 5-ethyl-5-phenylhexahydropyrimidine-4,6-dione.

What we claim is:

1. A process for the manufacture of pyrimidine derivatives of the formula:

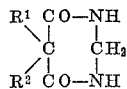

which comprises electrolytically reducing an imino-derivative of the formula:

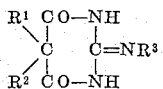

wherein $R^1$ is selected from the group consisting of phenyl and halophenyl, $R^2$ stands for an alkyl radical, and wherein $R^3$ is selected from the group consisting of hydrogen and the cyano radical, said electrolytic reduction being carried out in the presence of sulphuric acid using a current density sufficient to provide the desired reduction.

2. A process as claimed in claim 1 wherein the reduction is brought about by electrolytic reduction in the presence of sulphuric acid using a cathode of a material selected from the group consisting of lead, mercury, zinc and tin, and an anode of a material selected from the group consisting of lead, platinum and carbon.

3. A process as claimed in claim 1 which comprises suspending the imino-derivative in sulphuric acid, providing a lead anode and cathode in electrically conductive relationship with respect to said suspension, passing direct current of from 2 to 5 amps through the resulting cell until said derivative is substantially completely reduced, thereafter filtering the reduction medium, mixing the filtrate with water, cooling, again filtering and then water washing the solid residue comprising the desired pyrimidine derivative until said residue is acid-free.

References Cited by the Examiner
UNITED STATES PATENTS

| | | | |
|---|---|---|---|
| 680,543 | 8/01 | Pip | 204—74 |
| 1,947,732 | 2/34 | Parkes | 204—74 |
| 2,273,796 | 2/42 | Heise et al. | 204—74 |
| 2,485,982 | 10/49 | McMillan | 204—74 |
| 2,578,847 | 12/51 | Boan et al. | 260—260 |
| 2,760,962 | 8/56 | Vosey | 260—260 |

OTHER REFERENCES

Sugino et al.: Journal of the Electro-Chemical Society, vol. 104, November 1957, pages 667–672.

WINSTON A. DOUGLAS, *Primary Examiner.*

IRVIN MARCUS, JOHN R. SPECK, *Examiners.*